United States Patent

[11] 3,617,969

[72] Inventor Frank W. Heinrichs
 McMurray, Pa.
[21] Appl. No. 847,812
[22] Filed July 28, 1969
[45] Patented Nov. 2, 1971
[73] Assignee McGraw Edison Company
 Elgin, Ill.

[54] ADHESIVE AND METHOD OF APPLYING SAME
 10 Claims, 6 Drawing Figs.
[52] U.S. Cl..................................... 336/199,
 156/305, 156/320, 156/335, 161/247, 161/257,
 260/33.4, 260/844
[51] Int. Cl........................................H01f 27/30,
 B32b 27/30, B32b 27/42
[50] Field of Search........................... 161/199,
 257, 257; 156/305, 320, 335; 260/33.4, 43 V, 844;
 336/60, 199

[56] References Cited
UNITED STATES PATENTS
2,684,350 7/1954 Williams....................... 161/199
2,745,073 5/1956 Swidelsky..................... 336/60
2,870,295 1/1959 Haroldson et al............. 156/335 X
2,917,481 12/1959 Masters....................... 260/844
2,964,491 12/1960 Rylander et al.............. 260/844
3,056,984 10/1962 Snitzer......................... 12/142
3,141,005 7/1964 Noll............................. 260/844 X
3,435,127 3/1969 Rose............................ 156/305 X
3,442,834 5/1969 Flowers et al................ 260/844

*Primary Examiner*—Harold Ansher
*Assistant Examiner*—D. J. Fritsch
*Attorneys*—John W. Michael, Gerrit D. Foster, Bayard H. Michael, Paul R. Puerner, Joseph A. Gemignani, Andrew O. Riteris and Daniel Van Dyke

ABSTRACT: An adhesive is provided which includes polyvinyl butyral to improve the corona starting voltage characteristics of the adhesive. The adhesive is a mixture of a polyvinyl butyral varnish with an equal amount of phenolic resin varnish. The phenolic is a predominant ingredient by weight in the phenolic resin varnish but the polyvinyl butyral is not the predominant ingredient in the polyvinyl butyral varnish so that the resultant adhesive, although containing polyvinyl butyral, is predominantly phenolic.

Inventor
Frank W. Heinrichs
By Joseph A. Gemignani
Attorney

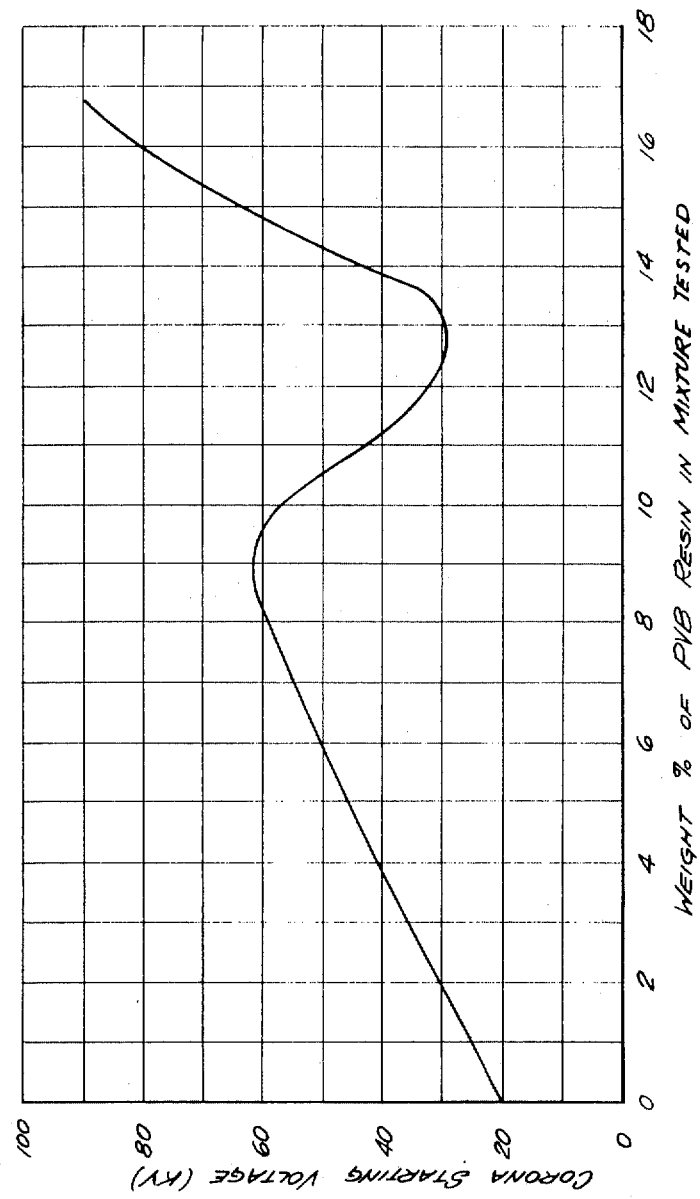

3,617,969

ADHESIVE AND METHOD OF APPLYING SAME

This application is a continuation-in-part of my prior field copending application Ser. No. 601,292 filed Nov. 21, 1966 and entitled "Adhesive and Method of Applying Same," and assigned to the assignee of this application.

BACKGROUND OF INVENTION

This invention relates to adhesives for use in electrical apparatus and to the method of applying such adhesives. More particularly, the invention relates to adhesives as may be used to join elements which, in operation, are exposed to a high-strength electrical field, the adhesive of this invention being effective to increase the corona starting voltage in that field.

The occurrence of corona discharge in various electrical applications is a well-known phenomenon. Also, it is well recognized that corona discharge can adversely affect the operation of various electrical apparatus and, also, can deteriorate the electrical apparatus itself. It has been discovered that, in electrical apparatus, the adhesive used to join elements which are disposed in a relatively high-strength electrical field has a marked effect on corona starting voltage in that field. Heretofore, in providing adhesives to join elements in electrical apparatus consideration has only been directed to the dielectric strength of the adhesive and its compatibility with other materials and insulation used in the electrical apparatus. Generally it has not been recognized that the adhesive has any effect on the corona starting voltage and, consequently, adhesives have generally been provided without regard to any effect the adhesive interface might have on the corona starting voltage.

For example, in a power transformer, adhesives are used at various points to connect elements such as insulation members provided in the transformer coil and core. The adhesive interface so formed is disposed in a relatively high-strength electrical field and has a marked effect on the corona starting voltage or gradient. A low corona starting voltage can result in corona discharge at an undesirable low level and such discharge, among other detrimental effects, has a tendency to degrade the electrical insulation within the power transformer and lead to electrical breakdown.

SUMMARY OF INVENTION

This invention arises out of the discovery that the adhesive has a marked effect on corona starting voltage and can provide a significant increase in the corona starting voltage so as to preclude corona discharge under normal operating conditions for the particular electrical apparatus.

Accordingly, an object of this invention is to provide a new and improved adhesive which significantly increases the corona starting voltage in a relatively high-strength electrical field.

Another object of this invention is to provide an adhesive interface which substantially increases corona starting voltage and a method of applying the adhesive to achieve that interface.

For the achievement of these and other objects, this invention proposes an adhesive for joining members in a relatively high voltage gradient electrical field, which adhesive is a mixture of polyvinyl butyral and a phenolic, with the phenolic, with respect to said polyvinyl butyral, being the predominant ingredient in the adhesive. This results in an adhesive which exhibits improved corona starting voltage characteristics due to the polyvinyl butyral and also has satisfactory mechanical properties due to the phenolic.

The adhesive is provided by mixing an amount of polyvinyl butyral solution with an equal amount of phenolic resin solution. The phenolic is the predominant ingredient by weight in the phenolic resin solution whereas the polyvinyl butyral, by weight, is not the predominant ingredient in the polyvinyl butyral solution. Thus, the resulting adhesive contains polyvinyl butyral for improving corona characteristics but it is predominantly phenolic.

DESCRIPTION OF DRAWINGS

FIG. 6 is a curve plotting corona starting voltage against percentage (by weight) of polyvinyl butyral in the solids of the adhesive mixture.

DESCRIPTION OF PREFERRED EMBODIMENT

Figure 1:
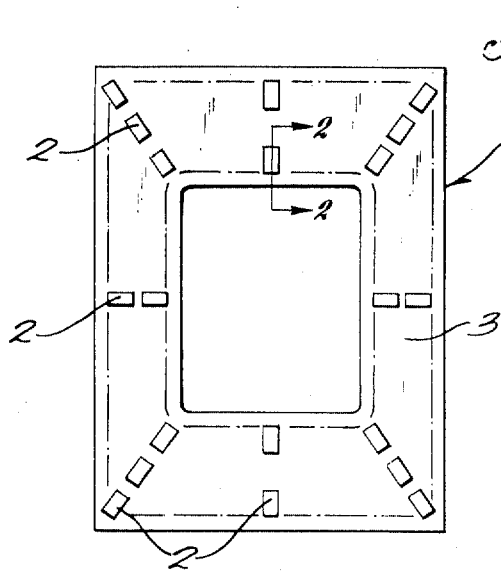
FIG. 1 illustrates an application of the adhesive of this invention.

An adhesive formulated in accordance with this invention comprises a mixture of polyvinyl butyral with a conventional phenolic. It has been discovered that polyvinyl butyral exhibits extremely good (i.e. high) corona starting voltage characteristics so that when mixed with phenolic resins, which generally exhibit relatively poor (i.e. low) corona starting voltage characteristics but desirable mechanical properties, the resulting adhesive will exhibit a significantly improved corona starting voltage.

For convenience, the adhesive of this invention will be discussed in connection with a power transformer, but it is not necessarily limited to any particular application.

Heretofore conventional adhesives used in electrical apparatus such as power transformers have been phenolic, polyvinyl alcohol, epoxy, shellac or similar type adhesives. These adhesives were selected for their insulating characteristics, and also for their compatibility with other material and insulating media used in the electrical apparatus, such as oil or gas. Polyvinyl butyral, as such, has been used in adhesives in the past but has never been considered from the standpoint of any effect it might have on corona starting voltage. For example, polyvinyl butyral has been considered for its adhesive properties in connection with joining various synthetic elements to metal and also for its mechanical characteristics as an effective adhesive, for example polyvinyl butyral is recognized as being capable of exhibiting relatively high ultimate shear strength. However, heretofore no one has recognized the significant electrical characteristic of polyvinyl butyral, namely its ability to substantially increase corona starting voltage, nor has it ever been recognized that the adhesive used could affect corona starting voltage.

The adhesive contemplated by this invention is a combination of polyvinyl butyral and phenolic, but is predominantly phenolic. An example of a formulation which results in an adhesive having both the improved mechanical characteristics and the improved corona starting voltage characteristics of this invention is a mixture of two solutions (I) a phenolic resin varnish (for example that available under the commercial designation 358 Sterling 358 which is a conventional phenol-aldehyde which consists of 54.5 percent (by weight) phenolic resin in denatured alcohol and (II) a polyvinyl butyral varnish which consists of 16.7 percent (by weight) polyvinyl butyral in denatured alcohol. These two solutions are mixed in equal proportions by weight or volume, 50 parts of the phenolic resin varnish with 50 parts of the polyvinyl butyral varnish. The resulting adhesive is predominantly phenolic and as a result exhibits good thermosetting characteristics and will provide high bond strength throughout the normal range of temperatures encountered in a power transformer. Moreover, with the inclusion of the polyvinyl butyral the corona starting voltage gradient of the resulting adhesive is markedly improved, being in excess of 160 kv. per inch. This corona starting gradient represents an increase of approximately 100 percent over that exhibited by a phenolic adhesive alone. For example, the phenolic resin adhesive, Sterling Y-358, alone normally exhibits a corona starting voltage gradient of 80 kv. per inch. Furthermore, this corona starting voltage of 160 kv. per inch is a significant improvement over other commonly accepted adhesives such as resin shellac which provides a corona starting voltage of approximately 30–50 kv. per inch.

FIG. 6 is a curve plotting corona starting voltage against different percentages by weight of polyvinyl butyral in the adhesive mixture of polyvinyl butyral varnish and phenolic resin varnish. The extreme left of the curve (polyvinyl butyral) illustrates the corona starting voltage with pure phenolic resin solution or varnish. The extreme right of the curve illustrates the corona starting voltage for pure polyvinyl butyral solution or varnish (i.e. approximately 16.7 percent by weight of polyvinyl butyral in the adhesive). The following table is correlated with the curve of FIG. 6 and gives the various values for different mixtures of polyvinyl butyral varnish and phenolic resin varnish but all mixtures providing a predominately phenolic adhesive. The 100-100 pound mixture of polyvinyl butyral varnish and phenolic resin varnish corresponds to the 50-50 part mixture described above. It should be noted, however, that the corona starting voltage in the table is given in absolute values whereas in the previously described example it was expressed as a gradient.

| | 52% solids phenolic varnish Y-358 (lbs.) | Corona starting voltage (kv.) | 167.7% solids PVB varnish (lbs.) | Phenolic resin (lbs.) | PVB resin (lbs.) | Solvent (lbs.) | Total weight mixture (lbs.) | Mixture weight percent phenolic | Mixture weight percent PVB | Percent solids mixture | Ratio weight PVB resin to phenolic resin |
|---|---|---|---|---|---|---|---|---|---|---|---|
| 1 | 100 | 57 | 80 | 52 | 13.4 | 114.6 | 180 | 28.9 | 7.5 | 36.4 | 25.8/100 |
| 2 | 100 | 58 | 90 | 52 | 15.1 | 122.9 | 190 | 27.4 | 7.9 | 35.3 | 29/100 |
| 3 | 100 | 60 | 100 | 52 | 16.7 | 131.3 | 200 | 26.0 | 8.4 | 34.4 | 32/100 |
| 4 | 100 | 60 | 120 | 52 | 20.0 | 148.0 | 220 | 24.6 | 9.1 | 33.7 | 38.5/100 |
| 5 | 100 | 60 | 140 | 52 | 23.3 | 164.7 | 240 | 21.6 | 9.7 | 31.3 | 45/100 |

Referring to FIG. 6, a satisfactory adhesive from both a mechanical and electrical standpoint is one wherein the amount of polyvinyl butyral in the starting adhesive solution is in the range of about 6 to about 10.5 percent by weight based on the total weight of the solution. Optimum results are obtained when the amount of polyvinyl butyral in the starting solution is in the range of about 8.5 to about 9.5 percent by weight based on the total weight of the solution, the peak of the first rise of the curve. Table I shows the weight ratio of polyvinyl butyral to the phenolic resin in the resultant adhesive composition will be in a range equivalent to about 25.8 to about 45 lbs. of polyvinyl butyral per 100 lbs. of the phenolic resin.

Figure 2:
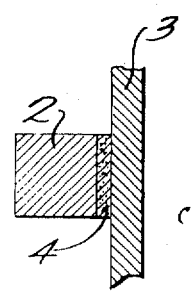
FIG. 2 is a section view along line 2—2 of FIG. 1.

With particular reference to the drawings, FIGS. 1 and 2 illustrate an insulating barrier 1 normally used to separate the coil assemblies in a shell-form transformer. In this application a number of spacer blocks 2, which can be of any suitable electrical insulating material such as Kraft board, are attached to a panel 3, again of any suitable electrical insulating material. Generally, the connection between the spacer blocks and the panel is made through an adhesive layer 4. It is at this point that the adhesive of this invention is used. By joining the blocks and panel using a polyvinyl butyral and phenolic mixture adhesive the corona starting voltage is markedly increased as discussed above.

Figure 3:
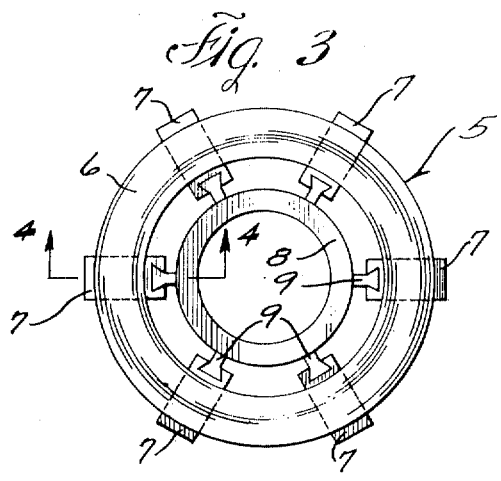
FIG. 3 illustrates an alternative application of this invention.
Figure 4:
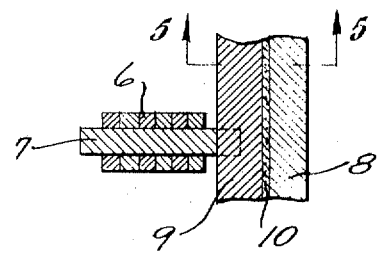
FIG. 4 is a section view along line 4—4 of FIG. 3.
Figure 5:
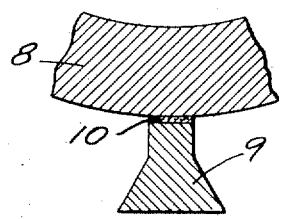
FIG. 5 is a section view along line 5—5 of FIG. 4.

FIG. 3, 4 and 5 illustrate a portion of a coil assembly 5 used in core-form transformer, one alternative application of the adhesive of this invention. Windings 6 are separated at spaced points by radial spacers 7 of insulating material. The radial spacers are connected to a cylindrical barrier 8 which is of insulating material and surrounds a leg of the transformer core (not shown). The connection of the radial spacers to barrier 8 is made using blocks 9 attached to the barrier by an adhesive layer 10. The adhesive of this invention is used at layer 10 and again results in a market improvement in corona starting voltage.

It has also been discovered that the corona starting voltage can be improved still further by providing an adhesive coating which is relatively thin and of uniform consistency i.e., free of voids or pockets containing entrapped air, other gaseous media or solution (in this instance the alcohol). To achieve an adhesive layer having these characteristics this invention proposes coating the phenolic-polyvinyl butyral fluid adhesive mixture in a normal manner onto one or both of the elements to be connected. The layer is then smoothed, with the use of a doctor blade, scraper or the like, to reduce the thickness of the layer while at the same time breaking up any voids and pockets to release any entrapped medium. The adhesive coating is then baked for approximately 5 minutes at approximately 200° F. This baking, or "B-staging," removes approximately 90 percent of the solvent, again it being noted that the entrapped medium can be bubbles of either air, gas, or the alcohol of the solution. Preferably the thickness of the adhesive layer is controlled and does not exceed 0.003 inches when dried.

The adhesive layer is now ready to be used in connecting two elements. This can be accomplished by heat-activating the adhesive layer and bringing the elements into contact through the adhesive layer. The heat-activated adhesive forms a tack bond between the elements and the adhesive layer is cured to set the adhesive and produce the final bond, for example the layer is cured by subjecting it to a temperature of approximately 135° C. for approximately 12 hours.

An alternative method of softening the adhesive film after "B-staging" is through the use of a suitable activator. A typical activator which has given satisfactory results is a mixture of denatured alcohol and acetone, preferably nine parts alcohol to one part acetone. After softening, or activation, of the film occurs the pieces to be bonded are brought together with light pressure. This again produces an initial tack bond as the activating medium dissolves into the adhesive parts. After the tack bond a final cure is made and air, gas and/or solution are driven off by baking the elements and adhesive layer at approximately 135° C. for 12 hours.

The polyvinyl butyral and phenolic mixture adhesive provides a strong mechanical bond between the elements, is generally compatible with the various insulating media used in electrical apparatus and, in addition, markedly increases the corona starting voltage across the adhesive interface. For example, within the normal operating range of a power transformer the occurrence of corona in the areas influenced by the adhesive is virtually precluded. This being particularly true where further attention is directed to the application and treatment of the adhesive to insure a layer which is free of voids and any entrapped medium and is also relatively thin and uniform. This adhesive can be used effectively to join any elements which are to be disposed in a high electrical field and where corona discharge may be a problem.

Although this invention has been illustrated and described in connection with particular embodiments thereof, it will be apparent to those skilled in the art that obvious changes and modifications may be made therein without departing from the spirit of the invention.

I claim:

1. In combination, first and second members adapted to be disposed in a relatively high voltage gradient electrical field, and an adhesive interface between and joining said first and second members and also adapted to be disposed in said field, said adhesive consisting essentially of polyvinyl butyral and a phenol-aldehyde resin in amounts equivalent to the ratio of about 25.8 to about 45 pounds of said polyvinyl butyral per 100 pounds of said phenol-aldehyde resin so that said adhesive has the effect of substantially increasing the corona starting voltage in said field in addition to affording a connection between said first and second members.

2. The combination of claim 1 wherein the thickness of said adhesive interface is of substantially uniform thickness and is substantially free of voids and media other than said polyvinyl butyral and phenol-aldehyde.

3. The combination of claim 2 wherein the thickness of said adhesive interface does not exceed 0.003 inches.

4. The combination of claim 1 wherein said first and second members are part of a transformer assembly said transformer and assembly comprising, a coil and core assembly, said first and second members comprising electrical insulating members making up a part of said coil and core assembly and positioned to be in the electrical field of said coil and core assembly when said coil is energized.

5. The process comprising the steps of preparing an adhesive mixture by admixing a polyvinyl butyral solution with a phenol-aldehyde resin solution, the solids in the resultant adhesive mixture being predominantly said phenol-aldehyde with the amount of said polyvinyl butyral in said resultant adhesive mixture being in the range of about 6.5 to about 10.5 percent by weight based on the total weight of said resultant adhesive mixture solution, applying said resultant adhesive mixture between two members to be joined, and setting said resultant adhesive mixture to provide an adhesive interface between and joining said two members, whereby when said joined members are disposed in a relatively high voltage gradient electrical field, said adhesive interface has the effect of substantially increasing the corona starting voltage in said field in addition to affording the connection between said first and second members.

6. The process of claim 5 wherein the solutions mixed to prepare said adhesive comprise polyvinyl butyral in a denatured alcohol solution and phenol-aldehyde resin in a denatured alcohol solution, and including the step of heating said adhesive mixture after application to release entrapped media.

7. The process of claim 5 wherein said adhesive mixture is applied to one of said members, and said members are brought together with said adhesive mixture therebetween and said adhesive mixture is treated prior to bringing said members together to thereby soften said adhesive to produce a tack bond between said members.

8. The process of claim 5 wherein a quantity of said polyvinyl butyral solution including approximately 16.7 percent by weight of polyvinyl butyral is admixed with an equal quantity by weight of said phenol-aldehyde resin solution which includes approximately 54.5 percent by weight of phenol-aldehyde resin.

9. The process of claim 5 wherein the amount of said polyvinyl butyral in said resultant adhesive mixture is in the range of about 8.5 to about 9.5 percent by weight based on the total weight of said resultant adhesive mixture.

10. The process of claim 5 wherein the amount of said polyvinyl butyral and said phenol-aldehyde in said resultant adhesive mixture is equivalent to the ratio of about 25.8 to about 45 lbs. of said polyvinyl butyral per 100 lbs. of said phenol-aldehyde resin.

* * * * *